United States Patent
Renner et al.

(10) Patent No.: US 6,943,847 B2
(45) Date of Patent: Sep. 13, 2005

(54) FM DEMODULATOR FOR SECAM DECODER

(75) Inventors: Karl Renner, Dallas, TX (US); Walter Demmer, Nuremberg (DE)

(73) Assignee: Texas Instruments Incorporated, Dallas, TX (US)

( * ) Notice: Subject to any disclaimer, the term of this patent is extended or adjusted under 35 U.S.C. 154(b) by 589 days.

(21) Appl. No.: 10/229,717

(22) Filed: Aug. 28, 2002

(65) Prior Publication Data

US 2003/0043301 A1 Mar. 6, 2003

Related U.S. Application Data

(60) Provisional application No. 60/316,591, filed on Aug. 31, 2001.

(51) Int. Cl.[7] .................................................. H04N 9/66
(52) U.S. Cl. ........................ 348/638; 348/727; 329/341
(58) Field of Search ................................ 348/638, 727, 348/726, 639, 640, 641; 329/315, 335, 341; H04N 9/66, 5/455

(56) References Cited

U.S. PATENT DOCUMENTS

| | | | |
|---|---|---|---|
| 3,949,417 A | 4/1976 | Nelson | |
| 4,488,119 A | * 12/1984 | Marshall | 329/323 |
| 4,924,300 A | 5/1990 | Vilard | |
| 5,194,938 A | 3/1993 | Imbert et al. | |
| 5,394,197 A | * 2/1995 | Kim | 348/708 |
| 5,440,269 A | * 8/1995 | Hwang | 329/318 |
| 5,621,477 A | 4/1997 | Demmer | |
| 5,621,478 A | 4/1997 | Demmer | |
| 6,151,080 A | * 11/2000 | Salle et al. | 348/638 |
| 6,188,788 B1 | 2/2001 | Renner et al. | |
| 6,215,528 B1 | * 4/2001 | Lin et al. | 348/641 |
| 6,219,107 B1 | 4/2001 | Renner et al. | |

* cited by examiner

*Primary Examiner*—Michael H. Lee
(74) *Attorney, Agent, or Firm*—J. Dennis Moore; W. James Brady, III; Frederick J. Telecky, Jr.

(57) ABSTRACT

A SECAM decoder and an FM modulator therefor are disclosed, in which a demodulated color signal is provided to indicate deviations in the frequency of modulated color information from a nominal subcarrier frequency. The demodulator comprises numerator and denominator filters operating on the modulated color information, and a divider providing a ratio result by dividing the numerator filter output by the denominator filter output. The demodulator may include two sets of numerator and denominator filters offset in phase from one another, where one of the two sets is selectively employed in order to mitigate divide-by-zero problems. Also disclosed are methods for demodulating digitized FM color signals in a SECAM decoder.

25 Claims, 6 Drawing Sheets

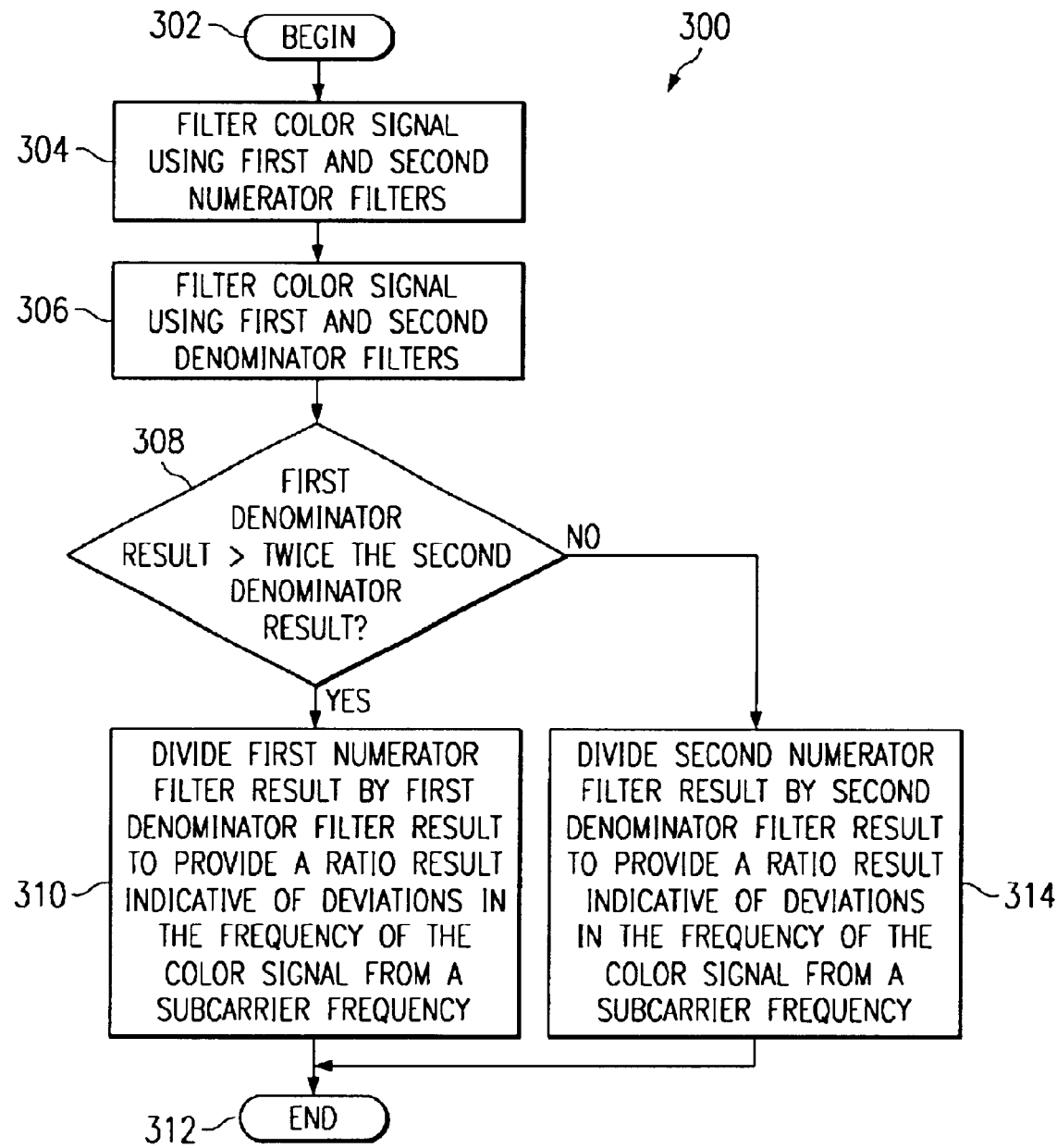

FM DEMODULATOR FOR SECAM DECODER

This application claims the benefit of Provisional Application No. 60/316,591, filed Aug. 31, 2001.

FIELD OF INVENTION

The present invention relates generally to the art of video decoders and more particularly to a SECAM decoder and an FM demodulator therefor.

BACKGROUND OF THE INVENTION

Video decoders are used in a variety of applications wherein analog video signals in a first format are digitized and decoded for use in other formats. Video consists of luma which represents a level between black and white and chroma which consists of two components containing color information. The analog video signal may comprise "S video", wherein separate channels are used for luma and chroma, or more typically, "composite video", where luma and chroma are included in the same signal. Typical color images are characterized in terms of red, green, and blue color components which are generated from luma and chroma. The video decoder digitizes analog video input signal information, for example, using an analog to digital converter (e.g., A/D) and separates the luma and chroma information in the digital domain.

The digitized video data may then be represented in a number of formats, including the YUV video format and the YCrCb video format. In the YUV format, the Y component represents the luma information required for a black and white system, the U component represents the difference between the value of B and the value of Y multiplied by a scale factor, and V is the difference between the value of R and the value of Y multiplied by a scale factor. The YUV format is a color space employed by the phase alternation line (e.g., PAL), national television system committee (e.g., NTSC), and systeme en couleur avec memoire (e.g., sequential color with memory, or SECAM) composite color video standards. SECAM is a color television standard developed in France, wherein 25 interlaced frames are broadcast per second (50 half frames per second) at 625 lines of resolution. SECAM is primarily found in France and Russia and many countries in Africa, Eastern Europe and the Middle East. YCrCb is another color video standard using scaled and offset versions of the YUV color space. Y generally has a nominal range of 16 to 235 with Cr and Cb ranging from 16 to 240, wherein 128 equals zero (for 8 bit output).

The PAL, NTSC, and SECAM color video standards are thus employed for transmission of composite analog video signals, which may be operated on by video decoders. A digital video decoder device requires the composite analog video signal to be first digitized using an A/D converter, and then the luma and chroma components to be separated. In the PAL and NTSC standards, the color information is amplitude (e.g., AM) modulated, whereas SECAM video signals include frequency (e.g., FM) modulated color information. SECAM utilizes FM modulation to transmit its color information, including color difference signals Db and Dr. In the SECAM format, the Db and Dr difference signals are alternatively transmitted Db, Dr, Db, Dr, . . . , and so on, wherein the Db and Dr components each have a different subcarrier frequency. For instance, SECAM employs a first nominal subcarrier frequency of 4.25 MHz for the Db component, and second nominal frequency of 4.40625 MHz for the Dr component.

Because of the FM modulation of analog color information in SECAM, the isolated digitized color information in a SECAM decoder is presented to an FM demodulator to obtain a demodulated color signal having amplitude variations representative of variations or deviations from the nominal subcarrier frequency. The demodulated color signal may then be operated on digitally in order to reformat, process, or otherwise manipulate the color information as needed. The decoder may then provide corresponding video output signals, such as in YCrCb for use in television or other video systems.

However, several problems exist in the implementation of FM demodulators for operating on the digitized video color signals. Discrete time equivalents of analog FM demodulators (e.g., like the "one-shot type") or simple digital methods (e.g., the "frequency counter type") require high clock frequencies (e.g., about 6 GHz). Phase locked loop (e.g., PLL) type FM demodulators have less stringent clock frequency requirements than the above. However, for a modulation index of 400 kHz at a bandwidth of 1.2 MHz and a carrier frequency of 4.286 MHz, a 13.5 MHz clock is marginal. Moreover, the PLL type FM demodulator may be sensitive to amplitude variations in the carrier signal. Although statically, the PLL type demodulator cares little about the amplitude of the FM-carrier signal, in operation the loop dynamics depend highly on well conditioned input signals such that an automatic gain control (AGC) may be required prior to FM-demodulation.

So called "product type" FM demodulators have acceptable clock frequency requirements, but suffer from higher sensitivity to carrier signal amplitude variations. In zero-crossing FM demodulators, samples occur only after a zero crossing of the FM-carrier signal. As these zero crossings occur asynchronously with respect to the clock frequency, complicated re-shuffling and sample rate conversion are needed to prevent non-equidistant sampling. Accordingly, there is a need for improved FM demodulation apparatus and techniques for video decoders, by which the effects of carrier signal amplitude variations may be mitigated without requiring high clock frequencies.

SUMMARY OF THE INVENTION

The following presents a simplified summary in order to provide a basic understanding of some aspects of the invention. This summary is not an extensive overview of the invention. It is intended to neither identify key or critical elements of the invention nor to delineate the scope of the invention. Rather, the primary purpose of this summary is to present some concepts of the invention in a simplified form as a prelude to the more detailed description that is presented later.

The present invention relates to SECAM decoders and FM modulators therefor, in which a demodulated color signal is provided to indicate deviations in the frequency of modulated color information from the subcarrier frequency. One aspect of the invention provides an FM demodulator having numerator and denominator filters operating on the modulated color information, and a divider providing a ratio result by dividing the numerator filter output or result by the denominator filter output. The ratio of filtered outputs provides a cancellation of carrier amplitude, thereby reducing or avoiding the susceptibility to carrier amplitude variations found in other demodulators.

According to another aspect of the invention, the demodulator may employ two pairs or sets of numerator and denominator filters offset in phase from one another, where one of the two sets is selectively employed in order to mitigate divide-by-zero problems associated with obtaining the ratio. The selective employment of one or the other filter set may advantageously provide conditional replenishment of the demodulator output, for example, where one denominator filter output crosses through zero or has a very small value. For example, in one implementation, two denominator filter result values are compared, and a numerator/denominator filter set is selected (e.g., using a comparator and multiplexer) so as to mitigate divide-by-zero conditions in producing the ratio result. In this regard, the two filter sets are offset in phase from one another, so as to ensure that where one set yields a zero or small denominator value, the other set will not. In this manner, the invention provides the advantages associated with ratio-based demodulation, while mitigating or avoiding problems associated with zero or small number denominator division through conditional replenishment of the output.

Yet another aspect of the invention involves methodologies for demodulating digitized FM color signals in a SECAM decoder. The method involves filtering a modulated color signal using a numerator filter to provide a numerator result and filtering the modulated color signal using a denominator filter to provide a denominator result. Thereafter, the numerator result is divided by the denominator result to provide a ratio result indicative of deviations in the frequency of the modulated color signal from a nominal subcarrier frequency. The filtering using the numerator filter may comprise using first and second numerator filters to provide first and second numerator results, and the filtering using the denominator filter may be performed using first and second denominator filters to provide first and second denominator results, respectively. In this case, conditional replenishment may be used, wherein one of the first and second numerator results is divided by one of the first and second denominator results to provide the ratio result, according to a comparison of the two denominator filter results.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

FIG. 7 is a flow diagram illustrating an exemplary method for demodulating digitized FM color signals in a SECAM decoder according to another aspect of the invention.

DETAILED DESCRIPTION OF THE INVENTION

Figure 1:
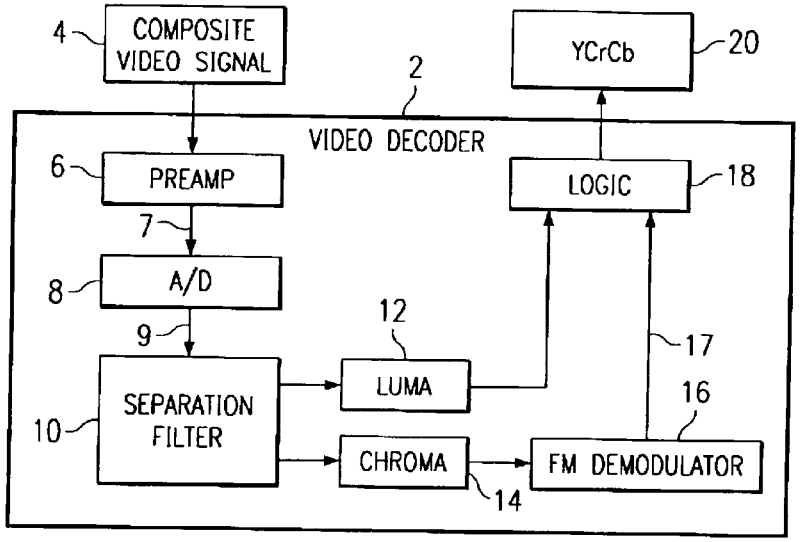
FIG. 1 is a schematic diagram illustrating an exemplary video decoder with an FM demodulator in accordance with an aspect of the present invention.

One or more implementations of the present invention will now be described with reference to the attached drawings, wherein like reference numerals are used to refer to like elements throughout. The invention relates to a SECAM decoder and an FM modulator therefor, in which a demodulated color signal is provided to indicate deviations in the frequency of modulated color information from a nominal subcarrier frequency. The demodulator comprises numerator and denominator filters operating on the modulated color information, and a divider providing a ratio result by dividing the numerator filter output by the denominator filter output. The demodulator may include two pairs of numerator and denominator filters offset in phase from one another, where one of the two sets is selectively employed in order to mitigate divide-by-zero (e.g., or divide by small number) problems. Also disclosed are methods for demodulating digitized FM color signals in a SECAM decoder.

Referring initially to FIG. 1, an illustration of an exemplary SECAM decoder 2 is provided, such as in the form of an integrated circuit, wherein the decoder 2 receives an analog composite video signal 4, which includes luma, chroma, and synchronization information, and provides the signal 4 to a preamplifier (hereinafter "preamp") 6. The preamp component 6 receives and conditions the analog signal 4, for example, by clamping the signal 4 to an internal reference voltage (not shown), amplifying the signal 4, and offsetting the result. The conditioned analog video information or signal 7 is then digitized using an analog to digital (A/D) converter 8, thus providing a digital composite video signal 9 to a digital separation filter 10. The digital separation filter 10 separates the composite information 9 into a luma component 12 and a chroma component 14.

In accordance with the SECAM color video standard, the chroma component 14 is frequency (e.g., FM) modulated using a carrier signal. The chroma information 14 is then provided to an FM demodulator 16, which filters the information 14 and performs a division to generate a ratio result 17 indicative of deviations in the frequency of the chroma signal 14 and a subcarrier frequency. In accordance with an aspect of the invention, as illustrated and described in greater detail below, the ratio-based demodulator 16 mitigates problems associated with carrier signal amplitude variations. In addition, the demodulator 16 may employ conditional replenishment to avoid or mitigate divide-by-zero (e.g., and/or divide by small number) problems associated with performing the division to obtain the ratio result.

The demodulated chroma information 17 is then provided from the FM demodulator 16 to a logic component 18, together with the digitized luma component 12. The demodulated chroma signal 17 and luma signal 18 are then operated on digitally and reformatted as needed in the logic 18. The decoder 2 then provides a corresponding video output signal 20, such as in YCrCb form, for use in television or other video systems (not shown). For instance, the logic component 18 may form U and V signals by applying certain scale and offset factors to the luma component 12 and the demodulated chroma 17, and adjust the information to certain levels. The logic 18 then outputs the digital YCrCb signal 20. The digital YCrCb signal 20 may then be fed to a video encoder (not shown) for conversion to analog form, or may be further processed in digital form. For example, graphics may be overlayed in the image represented by the signal 20, the signal 20 may be scaled, or other operations may be performed on the signal 20 using digital signal processing techniques as are known.

Figure 2A:
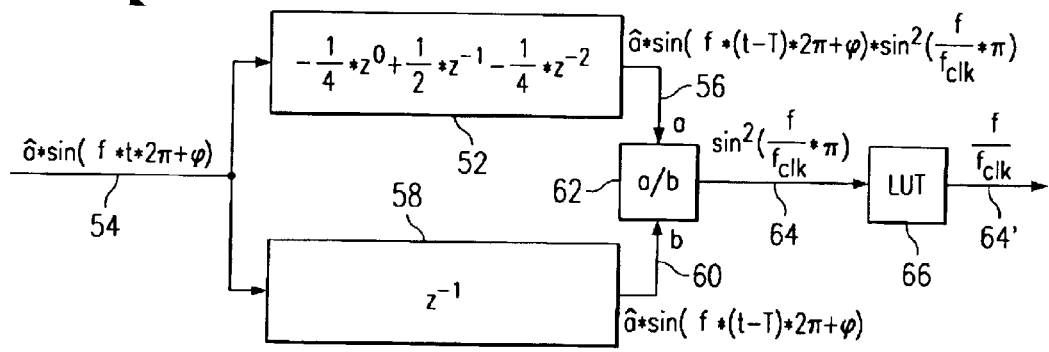
FIG. 2a is a schematic diagram illustrating a ratio-based FM demodulator with numerator and denominator filters and a divider producing a ratio result indicative of frequency deviations according to another aspect of the invention.

Referring now to FIG. 2a, the invention provides improved FM demodulators (e.g., demodulator 16) for SECAM decoders such as decoder 2, as well as methods for demodulating digitized color signals in such a SECAM decoder 2. Although one or more demodulator hardware implementations are illustrated hereinafter, FM demodulators in accordance with the invention can be implemented in hardware, software, and/or combinations thereof, and it will be appreciated by those skilled in the art that all such implementations are contemplated as falling within the scope of the present invention. In one implementation of SECAM decoder FM demodulation of the invention, a demodulator circuit 50 comprises a numerator filter 52 receiving digitized color information 54 (e.g., from separation logic component 10 of FIG. 1), for example, given by the following equation (1):

$$\hat{a} * \sin(f*t*2\pi+\phi). \quad (1)$$

In the various filters of FIG. 2a and other figures herein, the "z" domain transfer characteristics thereof are illustrated, as well as the time domain representations for ease of understanding. For instance, the filter 52 has a z domain transfer characteristic involving $z^0$, $z^{-1}$, and $z^{-2}$, wherein $z^0$ is the current sample, $z^{-1}$ the previous sample, and $z^{-2}$ is the next most recent sample. As can be seen from the time domain representation of equation (1), the signal 54 is a function of a carrier signal amplitude $\hat{a}$. The numerator filter 52 operates on the color information 54 and provides a numerator result 56, which is given by the following equation (2):

$$\hat{a} * \sin(f*(t-T)*2\pi+\phi)* \sin^2((f/f_{clk})*\pi). \quad (2)$$

The numerator result 56 is thus dependent upon the amplitude $\hat{a}$ of the carrier signal, a time delay T and the ratio of the frequency f to a clock frequency $f_{clk}$.

The demodulator 50 further comprises a denominator filter 58 (e.g., a delay having a z-domain transfer function of $z^{-1}$), which also operates on the color information signal 54 to provide a denominator result 60 given by the following equation (3):

$$\hat{a} * \sin(f*(t-T)*2\pi+\phi). \quad (3)$$

Comparing the numerator and denominator results 56 and 60, respectively (e.g., equations (2) and (3)), it is seen that both are functions of the carrier amplitude $\hat{a}$, the time delay T, and a phase shift $\phi$. A divider 62 receives the numerator and denominator results 56 and 60 from the numerator and denominator filters 52 and 58, respectively, and divides the numerator result 56 by the denominator result 60 to provide a ratio result 64, which is given by the following equation (4):

$$\sin^2((f/f_{clk})*\pi). \quad (4)$$

The ratio result 64 from the divider 62 is thus a function of deviations in the frequency f of the modulated color information from the clock frequency $f_{clk}$. The ratio-based demodulator 50 thus provides the ratio result 64 which is independent of the carrier amplitude $\hat{a}$, the time delay T, and a phase shift $\phi$. The result signal value 64 is then input, for example, into a lookup table (LUT) 66, which performs an inverse $\sin^2$ operation, to provide a ratio result 64' which is simply the frequency ratio $f/f_{clk}$. In the demodulator 50 of FIG. 2a, it will be noted that a filtered version of the color information signal 54 is divided by a delay compensated version, thereby turning the frequency response of the numerator filter 52 into the transfer function of the FM demodulator 50.

Figure 2B:
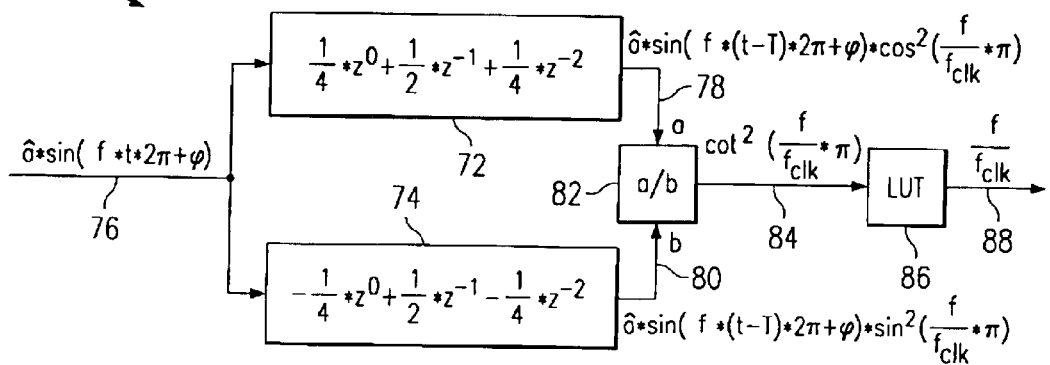
FIG. 2b is a schematic diagram illustrating another ratio-based FM demodulator in accordance with the invention.

Another implementation of one or more aspects of the invention is illustrated in FIG. 2b, where another FM demodulator 70 is illustrated having numerator and denominator filters 72 and 74, respectively, operating on an incoming digitized FM modulated color information signal 76. The filters 72 and 74 provide numerator and denominator results 78 and 80, given by the following equations (5) and (6), respectively:

$$\hat{a} * \sin(f*(t-T)*2\pi+\phi)* \cos^2((f/f_{clk})*\pi) \quad (5)$$

$$\hat{a} * \sin(f*(t-T)*2\pi+\phi)* \sin^2((f/f_{clk})*\pi). \quad (6)$$

The filter results 78 and 80 are provided to a divider 82, which divides the numerator result value 78 by the denominator result value 80 to provide a first ratio result 84, given by the following equation (7):

$$\cot^2((f/f_{clk})*\pi). \quad (7)$$

A lookup table LUT 86, for example, then provides the inverse cotangent squared of the ratio result 84 to generate the final ratio result 88 of $f/f_{clk}$.

Figure 2C:
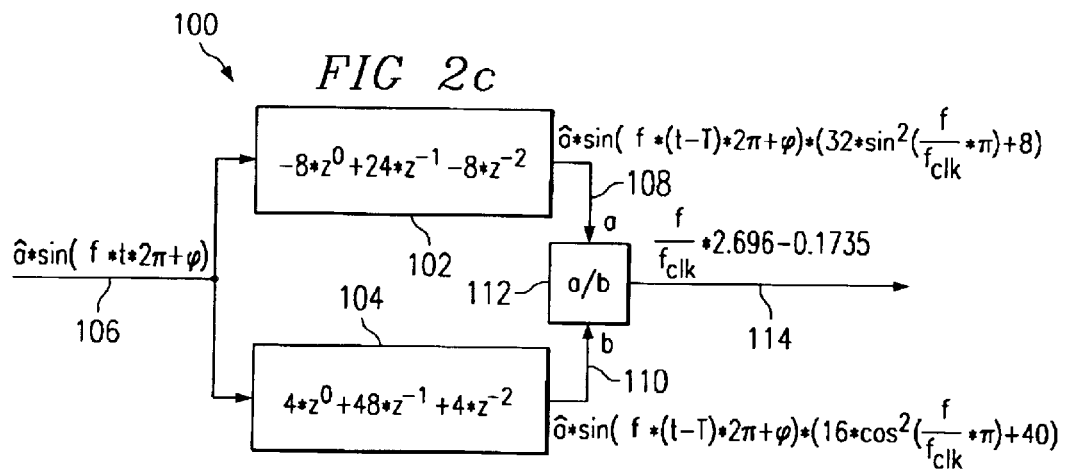
FIG. 2c is a schematic diagram illustrating yet another ratio-based FM demodulator in accordance with the invention.

A further refinement of the ratio-based demodulation is illustrated in FIG. 2c, wherein the filter characteristics are altered to result in a transfer characteristic for another exemplary FM demodulator 100 that approximates a linear function, eliminating the need for a lookup table. The modulator 100 comprises numerator and denominator filters 102 and 104, respectively, receiving a digitized FM modulated color information signal 106. The filters 102 and 104 provide numerator and denominator results 108 and 110, given by the following equations (8) and (9), respectively:

$$\hat{a} * \sin(f*(t-T)*2\pi+\phi)*(32* \sin^2((f/f_{clk})*\pi)+8). \quad (8)$$

$$\hat{a} * \sin(f*(t-T)*2\pi+\phi)*(16* \cos^2((f/f_{clk})*\pi)+40). \quad (9)$$

The filter results 108 and 110 are provided to a divider 112, which divides the numerator result value 108 by the denominator result value 110 to provide a ratio result 114, given by the following equation which is a linear approximation of the actual output (10):

$$f/f_{clk}*2.696-0.1735. \quad (10)$$

Figure 5:
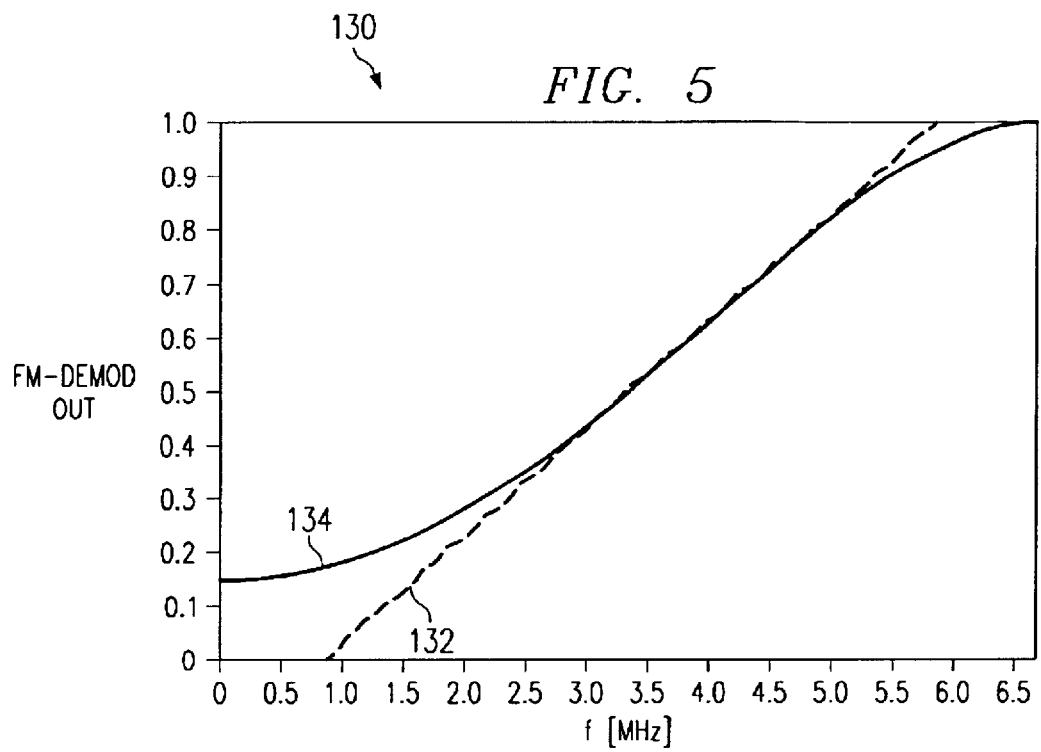
FIG. 5 is a graph illustrating the output vs. frequency for the exemplary demodulator of FIGS. 3–4b.
Figure 6:
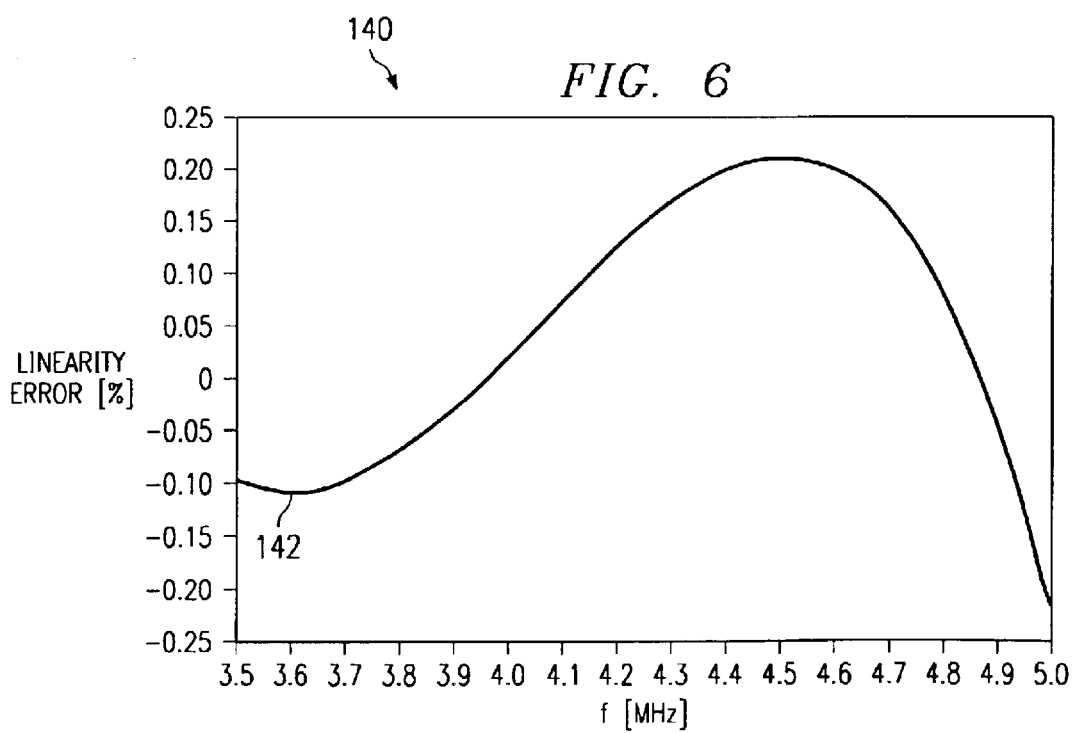
FIG. 6 is a graph illustrating linearity error vs. frequency for the exemplary demodulator of FIGS. 3–4b.

As this linear ratio result 114 does not involve complex trigonometric formulas, no lookup table is required to obtain the result 114, which is indicative of deviations in the signal frequency from that of the nominal subcarrier. Referring also to FIGS. 5 and 6, graphs 130 and 140 thereof illustrate output vs. frequency and linearity error vs. frequency, respectively, for the linear approximation provided in the ratio result 114 of FIG. 2c. In FIG. 5, the linear approximation 132 for the ratio result 114 in demodulator 100 is illustrated in dashed line along with the actual output 134 versus frequency. The graph 140 of FIG. 6 illustrates a curve 142 of linearity error for the approximation versus frequency. From the curves 132, 134, and 142 of FIGS. 5 and 6, it is seen that the linear approximation advantageously eliminates the need for a lookup table within the frequency band of interest (e.g., from about 3 MHz to about 5 MHz) without significant error.

It is noted at this point that the ratio-based FM demodulators illustrated and described above with respect to FIGS. 2a–2c provide for dividing out the carrier amplitude dependency in computing the ratio result. This provides advantages over prior digital FM demodulation techniques, such as digital equivalents of analog demodulators (e.g., one-shot or frequency counter types), PLL, product-type, and Philips-type demodulation. This is accomplished in part by the provision of a divider component in the demodulator to take the ratio of two filter result values. However, as can be appreciated, where a division is performed on digital data, there is a possibility that the denominator will be very small or zero from time to time, causing result overflow and other undesirable conditions.

Another aspect of the invention provides refinement for such ratio-based demodulators, by which such divide-by-zero (e.g., or divide by small number) problems may be reduced or avoided through conditional replenishment as illustrated and described below with respect to FIGS. 3-4b. The conditional replenishment techniques of this aspect of the invention may be implemented separately or in combination with the filtering techniques of FIG. 2c, wherein no lookup table is needed for the final ratio result $f/f_{clk}$. In this regard, it will be appreciated that in the denominator filters 58, 74, and 104 of the above demodulators 50, 70, and 100, respectively, individual samples (e.g., filtered and/or delayed) may, from time to time, be coincident with or come close to a zero crossing, whereby the denominator results associated therewith may be small or zero.

The invention provides for conditional replenishment of the denominator and/or the numerator to remedy this situation. Referring now to FIG. 3, another exemplary FM decoder 150 is illustrated, which may be employed to demodulate digital FM modulated color information signals in a SECAM video decoder. The demodulator 150 comprises a first numerator filter 152 (e.g., similar to the numerator filter 102 of demodulator 100, FIG. 2c), which receives a color information signal 154 and provides a first numerator result 156 given by the equation (11) below:

$$â* \sin(f*(t-2T)*2\pi+\phi)*(32* \sin^2((f/f_{clk})*\pi)+8). \quad (11)$$

A first denominator filter 158 (e.g., similar to denominator filter 104 of FIG. 2c) also receives the color information signal 154 and operates to provide a first denominator filter result 160 given by the following equation (12);

$$a* \sin(f*(t-2T)* 2\pi+\phi)*(16* \cos^2((f/f_{clk})*\pi)+40). \quad (12)$$

The demodulator 150 further comprises a divider 162 generating a ratio of numerator and denominator filter results 164 and 166 obtained via numerator and denominator multiplexers 168 and 170, respectively, to provide a ratio result 172. As with the demodulator 100 of FIG. 2c, the ratio 172 of the numerator and denominator filter results 164 and 166 provides a linear approximation indicative of deviations in the frequency of the color information with respect to the clock frequency, without a lookup table, due to the transfer characteristics of the numerator and denominator filters (e.g., filters 152 and 158). However, other implementations of the invention may employ filters having transfer characteristics different from those illustrated and described herein, which are contemplated as falling within the scope of the present invention. For example, other numerator and denominator filter transfer characteristics may be provided, wherein a lookup table is employed to obtain a ratio result indicative of such frequency deviations from the result of the division.

Another aspect of the invention is implemented in the demodulator 150, wherein conditional replenishment is employed to avoid or mitigate divide-by-zero or divide by small number conditions in the divider 162. This is accomplished by introducing second numerator and denominator filters 180 and 182, respectively, having the same ratio as the first filters 152 and 158 and the same group delay, but which have a 90 degree phase relationship with respect to the first filters 152 and 158. The second numerator filter 180 receives the modulated color signal 154 and provides a second numerator result 184 given by equation (13) below, and the second denominator filter 182 operates to provide a second denominator filter result 186 given by equation (14):

$$â* \sin(f*(t-2T)*2\pi+\phi)* \\ (32* \sin^2((f/f_{clk})*\pi)+8)*2* \sin((2f/f_{clk})*\pi). \quad (13)$$

$$â* \sin(f*(t-2T)*2\pi+\phi)* \\ (16* \cos^2((f/f_{clk})*\pi)+40)*2* \sin((2f/f_{clk})*\pi). \quad (14)$$

Both the numerator and the denominator results 164 and 166, respectively, are then derived from that set of filters (e.g., 152 and 158, or 180 and 182) providing the better conditioned value for the denominator, as selected by the multiplexers 168 and 170. Since the phase of both sets of filters is 90° apart, if a zero crossing (e.g., or small value) is obtained in one denominator filter result, the other denominator result will have a larger value, and the other set of filters is selectively employed to provide the ratio result 172. Accordingly, the demodulator 150 employs a comparator 190 to compare the first and second denominator filter results 160 and 186 to provide a selection signal 192 to the multiplexers 168 and 170 to select the appropriate set of filter results for provision to the divider 162.

In accordance with one exemplary aspect of the present invention, in the demodulator 150, the comparator 190 determines whether the absolute value of the first denominator filter result 160 is greater than twice the absolute value of the second denominator filter result 186. If so, the signal 192 has a first state, wherein the multiplexers 168 and 170 provide the first numerator and denominator filter results 156 and 160, respectively, to the divider 162. Otherwise, the selection signal 192 has a second state, wherein the second numerator and denominator filter results 184 and 186, are provided to the divider 162 via the multiplexers 168 and 170, respectively. In this manner, the set of filters which avoid zero divide (e.g., or small number divide) situations is selectively employed.

It will be appreciated that while the comparator 190 of the exemplary demodulator 150 selects the filter set according to a determination of whether the filter result 160 is greater than twice the filter result 186, that other comparisons may be made to select the filter set in accordance with the invention. For instance, the comparator 190 could alternatively select the filter set corresponding to the denominator filter having the largest absolute value result. Furthermore, although the filter sets in the exemplary demodulator 150 have a 90 degree phase relationship to one another, other implementations having different phase relationships are contemplated as falling within the scope of the present invention.

Figure 4B:
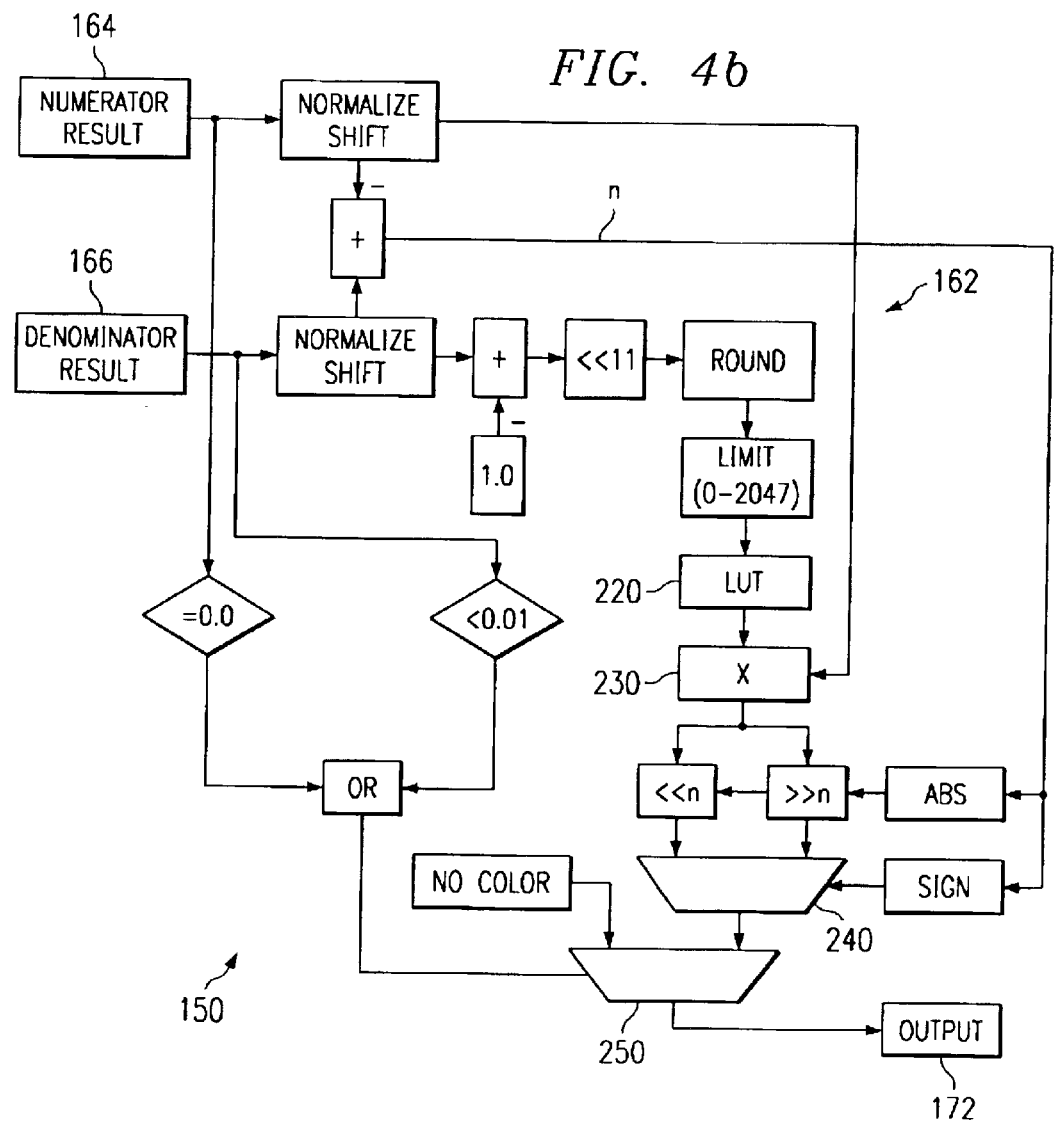
FIGS. 4a and 4b are schematic diagrams further illustrating the ratio-based FM demodulator of FIG. 3.
Figure 4A:
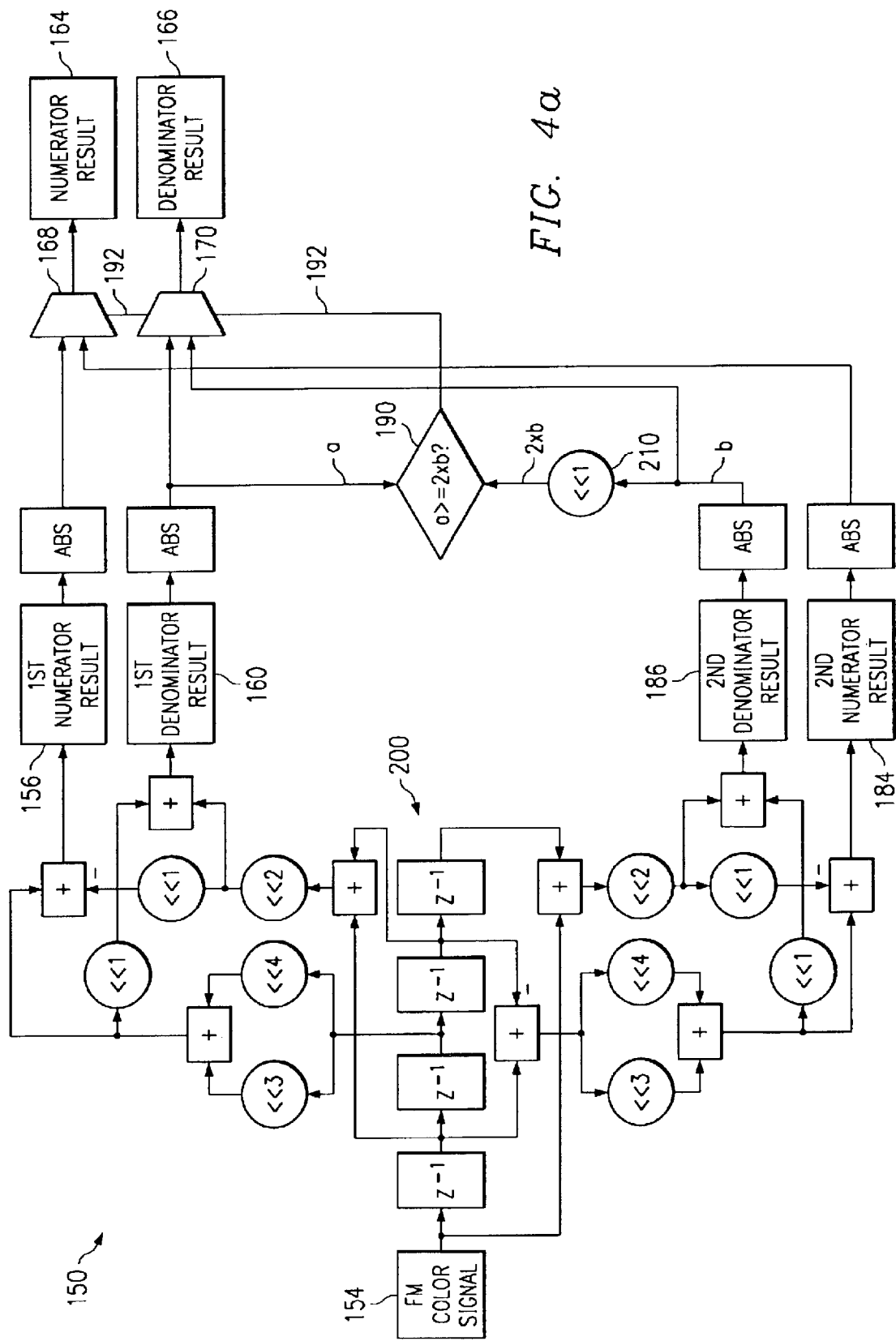

A more detailed illustration of the exemplary FM demodulator 150 is provided in FIGS. 4a and 4b. The digitized FM input signal 154 is fed into a series of four delay stages 200, indicated by the delay transfer characteristics $z^{-1}$ in the z domain. The delay stages provide the delayed samples (e.g., $z^{-1}, z^{-2}, z^{-3}$, and $z^{-4}$) employed in the filters 152, 180, 158, and 182, wherein the $z^0$ factor is obtained from the current sample of the signal 154. Each set of filters (e.g., first filters 152 and 158, or second filters 180 and 182) also share most of the coefficients, implemented as binary shifts and adds in FIG. 4*a*. In the drawing FIGS. 4*a* and 4*b*, binary left shifts are illustrated as a less than ("<<") symbol followed by an integer indicating the number of bits shifted, summation operations are indicated by blocks having a plus ("+") symbol, and multiplications are illustrated as blocks having an "x" (see FIG. 4*b*). The color information signal 154 is thus processed by various delays, shifts, and adds as illustrated in FIG. 4*a* to implement the filters 152, 180, 158, and 182 in the demodulator 150.

In this manner, the filters 152, 180, 158, and 182 provide filter results 156, 184, 160, and 186, respectively, and the absolute values of these results are then provided to the multiplexers 168 and 170. The second denominator filter result 186 is further shifted left by one bit at a shift 210, in effect, multiplying the result 186 by two. The shifted result is then provided to the comparator 190 along with the first denominator result 160. The comparator 190 provides a selection signal 192 to the multiplexers 168 and 170, which corresponds to the comparison. The multiplexers 168 and 170 thus provide the first numerator and denominator filter results 156 and 160, or the second numerator and denominator results 184 and 186 to the divider 162 (e.g., see also FIG. 4*b*) in accordance with the selection signal 192.

Since both the respective numerator and the denominator values in FIG. 4*a* have identical signs, sign extension in the divider 162 is avoided by turning all four filter output result values 156, 184, 160, and 186 into absolute values. The two denominator results 160 and 186 are then compared and the first set of filters (e.g., filters 152 and 158) is selected for input to the divider 162 if its absolute denominator value 160 exceeds twice the absolute denominator value 186 of the second set of filters (e.g., filters 180 and 182). In FIG. 4*b*, the divider 162 is implemented in accordance with one exemplary aspect of the invention using a lookup table 220 after normalization, shifting, and rounding, to generate the reciprocal of the selected denominator result value 166, which is then multiplied with the normalized numerator result 164 in a multiplier block 230. The ratio is then provided via the multiplexers 240 and 250 as the output ratio result 172 unless the numerator result 164 is zero or if the denominator result is less than 0.01, in which case data values corresponding to a NO COLOR signal is provided as the output 172 via multiplexer 250.

For example, both the numerator and denominator results 164 and 166 are normalized to fall in a range from 1.0 to 2.0 by such shifting. The shift constants from both normalization blocks may be subtracted to generate a final shift constant that is applied to the product output. Entries in the lookup table 220 fall in a range from 0.5 to 1.0, by which a range at the output of the multiplier 230 is 0.5 to 2.0. The multiplexer 240 selects the final shifted output based on the sign of the final shift constant. If the numerator result 164 is zero or if the denominator result 166 is small, the multiplexer 250 selects NO COLOR for the output 172.

In the exemplary FM demodulator 150, the filter coefficients are chosen according to various factors, and it will be appreciated that filters having other coefficients and transfer characteristics are contemplated as falling within the scope of the present invention. For example, the individual coefficients may be realizable by a minimum number of simple shifts and adds in order to economize hardware implementation. Alternatively or in combination, the coefficients may be chosen so as to result in an acceptable approximation of a linear ratio of output value versus FM input frequency for the entire FM demodulator 150. In this regard, this second condition advantageously avoids the need for a look-up table for linearization purposes, as illustrated and described above with respect to FIG. 2*c*.

Referring again to FIGS. 5 and 6, the illustrated coefficients in the filters of the demodulator 150 are one implementation which satisfies both goals. First, the coefficients are relatively simple to implement in hardware (e.g., FIGS. 4*a* and 4*b*), requiring mostly delays, shifts, and summations (binary). Secondly, as demonstrated in FIGS. 5 and 6, the FM demodulator output 172 approximates very closely a linear function (dashed) over the frequency range of interest (3.5 to 5.0 MHz). This linear function satisfies the following equation (15):

$$\text{OUTPUT} = -0.1735 + 2.969 * (f/f_{clk}). \tag{15}$$

FIG. 5 draws the deviation of the FM demodulator output 172 from this linear function. For the range of frequencies from 3.5 MHz to 5.0 MHz, the excursions from linearity remain less than 0.25%, satisfying 8 bit resolution, differentially and integrally.

The above is one implementation of a ratio-based FM demodulator 150 employing conditional replenishment in order to avoid or mitigate divide-by-zero problems. The ratio output 172 obtained has an amplitude indicative of the deviations in frequency between the color signal and the nominal subcarrier, and is less susceptible to carrier amplitude variations than are other non-ratio based FM demodulators. While the invention finds particular utility when employed in association with SECAM and other video decoder systems (e.g., integrated circuits), it will be appreciated that other implementations of the various aspects of the present invention fall within the scope of the appended claims, and that the invention is not limited to those applications or implementations illustrated and described herein. For example, the invention can be implemented in non-video type FM demodulation applications.

Another aspect of the present invention relates to methods and techniques for FM demodulation, by which various shortcomings associated with the prior art may be avoided or mitigated. This aspect provides for filtering a modulated color signal using a numerator filter to provide a numerator result, and filtering the modulated color signal using a denominator filter to provide a denominator result. The numerator result is then divided by the denominator result to provide a ratio result indicative of deviations in the frequency of the modulated color signal from a nominal subcarrier frequency. The filtering may comprise using first and second numerator filters to provide first and second numerator results, and first and second denominator filters to provide first and second denominator results. In this case, conditional replenishment may be employed, wherein one of the first and second numerator results is divided by one of the first and second denominator results to provide the ratio result, according to a comparison of the two denominator filter results.

One exemplary method 300 is illustrated in FIG. 7 in accordance with the invention. While the exemplary method 300 is illustrated and described herein as a series of acts or events, it will be appreciated that the present invention is not limited by the illustrated ordering of such acts or events, as some acts may occur in different orders and/or concurrently with respect to other acts or events apart from those illustrated and/or described herein, in accordance with the invention. In addition, not all illustrated steps may be required to implement a methodology in accordance with the present invention. Moreover, it will be appreciated that the method 300 may be implemented in association with the apparatus and systems illustrated and described herein as well as in association with other systems not illustrated.

Figure 3:
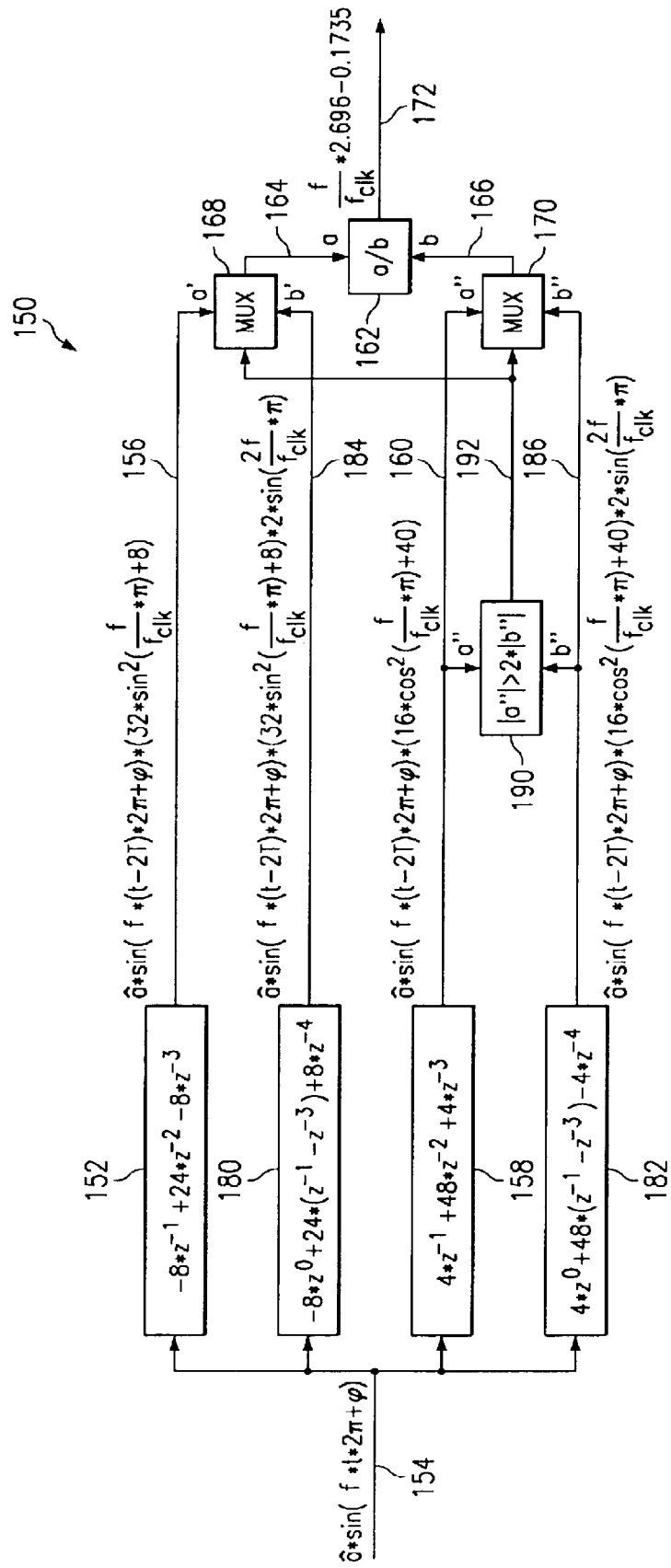
FIG. 3 is a schematic diagram illustrating another ratio-based FM demodulator with two sets of numerator and denominator filters, a comparator, and multiplexers for selectively employing one filter set in producing a ratio output in accordance with another aspect of the invention.

Beginning at 302, a color signal is filtered at 304 using first and second numerator filters, such as the filters 152 and 180, respectively, of the demodulator 150 of FIGS. 3–4b. At 306, the color signal is filtered using first and second denominator filters (e.g., filters 158 and 182, respectively). A determination is made at 308 as to whether the first denominator filter result is greater than twice the second denominator filter result. This determination is made in order to selectively use one or the other of the two sets of filters, so as to avoid divide-by-zero situations discussed above. If the first denominator result value exceeds twice the second denominator filter result (e.g., YES at 308), the method 300 proceeds to 310. At 310, the first numerator filter result is divided by the first denominator filter result to provide a ratio result representative of deviations in the frequency of the color signal from that of a nominal subcarrier. Thereafter, the method 300 ends at 312.

However, if the first denominator result value does not exceed twice the second denominator filter result (e.g., NO at 308), the second numerator filter result is divided by the second denominator result at 314, after which the method 300 ends at 312. Although the exemplary method 300 involves a comparison at 308 of the first denominator result value with twice the second denominator filter result value, other comparison criteria are possible in mitigating divide-by-zero (e.g., and/or divide by small number) conditions, and that all such comparison criteria are contemplated as falling within the scope of the present invention. For example, the values of the first and second denominator filter result values could be employed in accordance with the present invention.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", "has", "having", "with", or variants thereof are used in either the detailed description or the claims, such terms are intended to be inclusive in a manner similar to the term "comprising."

What is claimed is:

1. A FM demodulator for demodulating digitized FM modulated color information in a SECAM decoder, comprising:

a numerator filter receiving the color information and operative to provide a numerator result;

a denominator filter receiving the color information and operative to provide a denominator result; and a divider receiving the numerator result from the numerator filter and the denominator result from the denominator filter and operative to divide the numerator result by the denominator result to provide a ratio result indicative of deviations in the frequency of the modulated color information from a nominal subcarrier frequency.

2. The demodulator of claim 1, wherein the numerator filter comprises first and second numerator filters receiving the color information and operative to provide first and second numerator results, respectively, wherein the denominator filter comprises first and second denominator filters receiving the color information and operative to provide first and second denominator results, respectively, and wherein the divider is operative to selectively divide one of the first and second numerator results by one of the first and second denominator results to provide the ratio result.

3. The demodulator of claim 2, wherein the demodulator further comprises a comparator receiving the first and second denominator results from the denominator filters and operative to compare the first and second denominator results to provide a selection signal, and wherein the divider is operative to selectively divide one of the first and second numerator results by one of the first and second denominator results to provide the ratio result according to the selection signal.

4. The demodulator of claim 3, further comprising a multiplexer operative to selectively provide the first numerator and denominator results or the second numerator and denominator results to the divider according to the selection signal.

5. The demodulator of claim 4, wherein the multiplexer comprises a numerator multiplexer operative to selectively provide one of the first and second numerator results to the divider according to the selection signal, and a denominator multiplexer operative to selectively provide one of the first and second denominator results to the divider according to the selection signal.

6. The demodulator of claim 5, wherein the selection signal from the comparator comprises a first state if the first denominator result is greater than a constant times the second denominator result and a second state if the first denominator result is not greater than the constant times the second denominator result, and wherein the multiplexer selectively provides the first numerator and denominator results to the divider if the selection signal comprises the first state and provides the second numerator and denominator results to the divider if the selection signal comprises the second state.

7. The demodulator of claim 6, wherein the constant is 2.

8. The demodulator of claim 7, wherein the first numerator and denominator results are in phase with one another, wherein the second numerator and denominator results are in phase with one another, and wherein the first and second denominator results are out of phase with one another.

9. The demodulator of claim 8, wherein the first and second denominator results are shifted in phase by 90 degrees with respect to one another.

10. The demodulator of claim 3, wherein the selection signal from the comparator comprises a first state if the first denominator result is greater than twice the second denominator result and a second state if the first denominator result is not greater than twice the second denominator result, and wherein the multiplexer selectively provides the first numerator and denominator results to the divider if the selection signal comprises the first state and provides the second numerator and denominator results to the divider if the selection signal comprises the second state.

11. The demodulator of claim 10, wherein the first numerator and denominator results are in phase with one another, wherein the second numerator and denominator results are in phase with one another, and wherein the first and second denominator results are out of phase with one another.

12. The demodulator of claim 11, wherein the first and second denominator results are shifted in phase by 90 degrees with respect to one another.

13. The demodulator of claim 2, wherein the first numerator and denominator results are in phase with one another, wherein the second numerator and denominator results are in phase with one another, and wherein the first and second denominator results are out of phase with one another.

14. The demodulator of claim 13, wherein the first and second denominator results are shifted in phase by 90 degrees with respect to one another.

15. A SECAM video decoder for generating YCrCb signals from a composite SECAM video signal, comprising:
   an A/D converter receiving the composite SECAM video signal and operative to provide a digitized composite video signal;
   a first logic component operative to separate the composite video signal into a luminance signal and an FM modulated color signal;
   an FM demodulator for demodulating the FM modulated color signal, the FM demodulator comprising:
      a numerator filter receiving the FM modulated color signal and operative to provide a numerator result;
      a denominator filter receiving the FM modulated color signal and operative to provide a denominator result; and
      a divider receiving the numerator result from the numerator filter and the denominator result from the denominator filter and operative to divide the numerator result by the denominator result to provide a ratio result indicative of deviations in the frequency of the modulated color information from a nominal subcarrier frequency; and
   a second logic component operative to generate a YCrCb signal according to the luminance signal and the ratio result.

16. The SECAM video decoder of claim 15, wherein the numerator filter comprises first and second numerator filters receiving the color information and operative to provide first and second numerator results, respectively, wherein the denominator filter comprises first and second denominator filters receiving the color information and operative to provide first and second denominator results, respectively, wherein the FM demodulator further comprises a comparator receiving the first and second denominator results from the denominator filters and operative to compare the first and second denominator results to provide a selection signal, and wherein the divider is operative to selectively divide one of the first and second numerator results by one of the first and second denominator results to provide the ratio result according to the selection signal.

17. The SECAM video decoder of claim 16, wherein the FM demodulator further comprises a numerator multiplexer operative to selectively provide one of the first and second numerator results to the divider according to the selection signal, and a denominator multiplexer operative to selectively provide one of the first and second denominator results to the divider according to the selection signal.

18. The SECAM video decoder of claim 17, wherein the selection signal from the comparator comprises a first state if the first denominator result is greater than twice the second denominator result and a second state if the first denominator result is not greater than twice the second denominator result, and wherein the multiplexer selectively provides the first numerator and denominator results to the divider if the selection signal comprises the first state and provides the second numerator and denominator results to the divider if the selection signal comprises the second state.

19. The SECAM video decoder of claim 18, wherein the first numerator and denominator results are in phase with one another, wherein the second numerator and denominator results are in phase with one another, and wherein the first and second denominator results are 90 degrees out of phase with one another.

20. A method of demodulating a digitized FM modulated color signal in a video decoder, comprising:
   filtering the modulated color signal using a numerator filter to provide a numerator result;
   filtering the modulated color signal using a denominator filter to provide a denominator result; and
   dividing the numerator result by the denominator result to provide a ratio result indicative of deviations in the frequency of the modulated color signal from a nominal subcarrier frequency.

21. The method of claim 20, wherein filtering the modulated color signal using a numerator filter comprises filtering the modulated color signal using first and second numerator filters to provide first and second numerator results, respectively, wherein filtering the modulated color signal using a denominator filter comprises filtering the modulated color signal using first and second denominator filters to provide first and second denominator results, respectively, and wherein dividing the numerator result by the denominator result comprises selectively dividing one of the first and second numerator results by one of the first and second denominator results to provide the ratio result.

22. The method of claim 21, wherein selectively dividing one of the first and second numerator results by one of the first and second denominator results comprises comparing the first and second denominator results to provide a selection signal, and dividing one of the first and second numerator results by one of the first and second denominator results according to the selection signal.

23. The method of claim 22, wherein comparing the first and second denominator results to provide the selection signal comprises providing the selection signal having a first state if the first denominator result is greater than a constant times the second denominator result and providing the selection signal having a second state if the first denominator result is not greater than the constant times the second denominator result, and wherein dividing one of the first and second numerator results by one of the first and second denominator results according to the selection signal comprises dividing the first numerator result by the first denominator result if the selection signal comprises the first state and dividing the second numerator result by the second denominator result if the selection signal comprises the second state.

24. The method of claim 23, wherein comparing the first and second denominator results to provide the selection signal comprises providing the selection signal having a first state if the first denominator result is greater than twice the second denominator result and providing the selection signal having a second state if the first denominator result is not greater than twice the second denominator result.

25. The method of claim 24, wherein filtering the modulated color signal using first and second numerator filters comprises providing the first and second numerator results 90 degrees out of phase with one another, and wherein filtering the modulated color signal using first and second denominator filters comprises providing the first and second denominator results 90 degrees out of phase with one another.

* * * * *